(12) United States Patent
Madhavan et al.

(10) Patent No.: US 7,239,859 B2
(45) Date of Patent: Jul. 3, 2007

(54) METHOD AND SYSTEM FOR ESTABLISHING A TELEPHONY DATA CONNECTION TO RECEIVER

(75) Inventors: Sethu K. Madhavan, Canton, MI (US); David George, Windsor (CA); Fahd Laghrari, Warren, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/722,260

(22) Filed: Nov. 25, 2003

(65) Prior Publication Data

US 2005/0113061 A1 May 26, 2005

(51) Int. Cl.
*H04B 1/02* (2006.01)
*H04B 1/38* (2006.01)
*H04M 1/00* (2006.01)
*H04Q 7/20* (2006.01)

(52) U.S. Cl. ............... 455/403; 455/550.1; 455/556.2; 455/569.2; 455/575.9; 455/507; 455/560; 455/91

(58) Field of Classification Search ............ 455/91–96, 455/102, 110, 113, 119, 42, 45, 60, 517, 352, 455/556.1, 90.1–90.2, 569.1–569.2, 570, 455/575.9, 560–561, 557–558, 556.2, 701–702, 455/403, 507–508, 550.1, 553.1, 423–425, 455/426.1, 427, 418–420, 222–223, 130, 455/67.13, 115.1–115.4; 370/482, 485; 340/426.21, 340/426.2, 426.16, 445, 447

See application file for complete search history.

(56) References Cited

U.S. PATENT DOCUMENTS 3,731,201 A * 5/1973 Frisbie ........................ 455/91
4,499,339 A * 2/1985 Richard ...................... 332/149
6,144,336 A 11/2000 Preston et al.

* cited by examiner

*Primary Examiner*—Meless Zewdu
(74) *Attorney, Agent, or Firm*—Anthony Luke Simon

(57) ABSTRACT

The current invention provides a method for establishing a telephony data connection to a receiver. The telephony data connection is initiated at a source location. A carrier signal is generated for the connection and the carrier signal is modified. The modified carrier signal is sent to the receiver. Identification data is received from the receiver. A computer usable medium with suitable computer program code is employed for establishing a telephony data connection to a receiver.

13 Claims, 3 Drawing Sheets

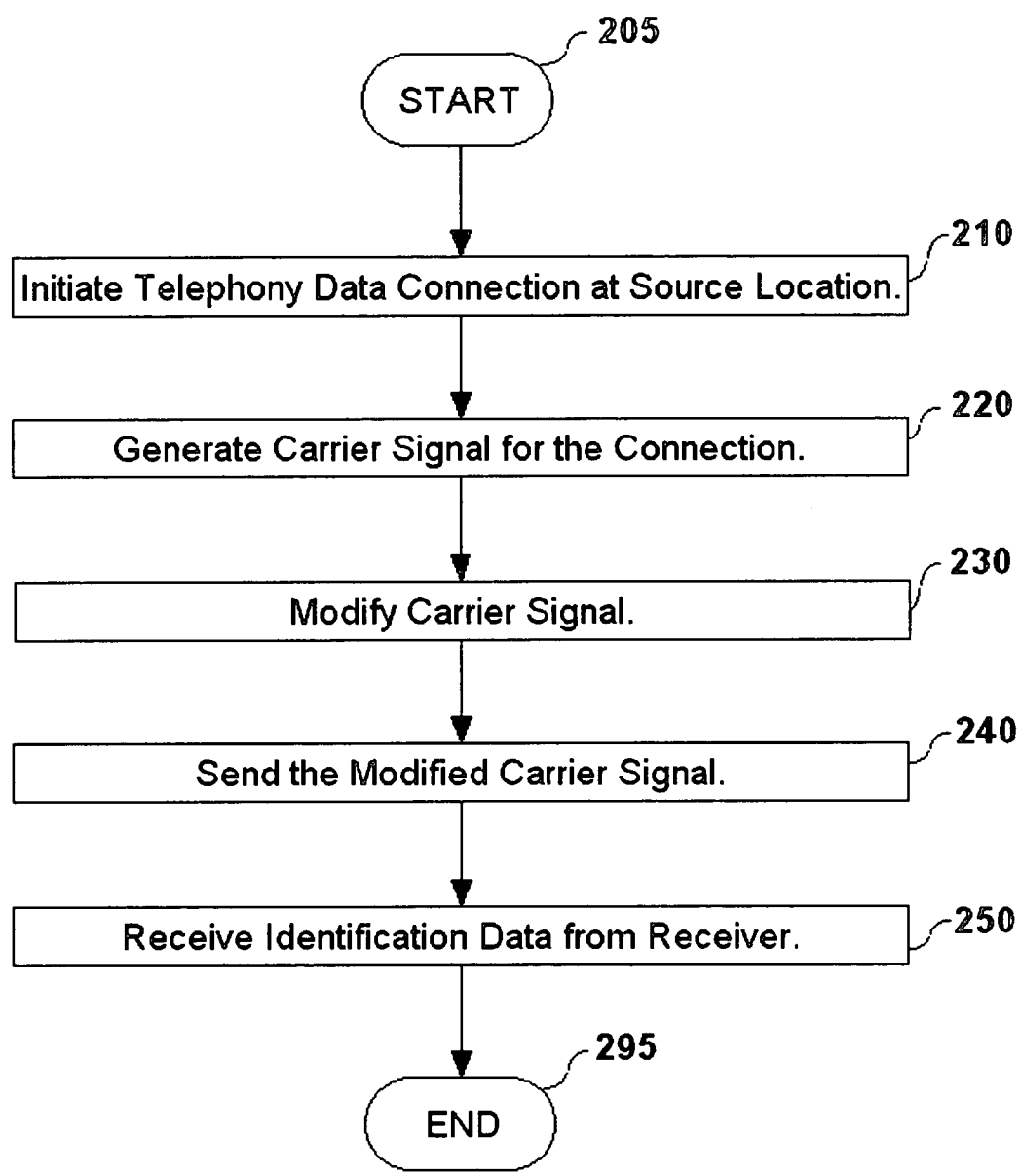

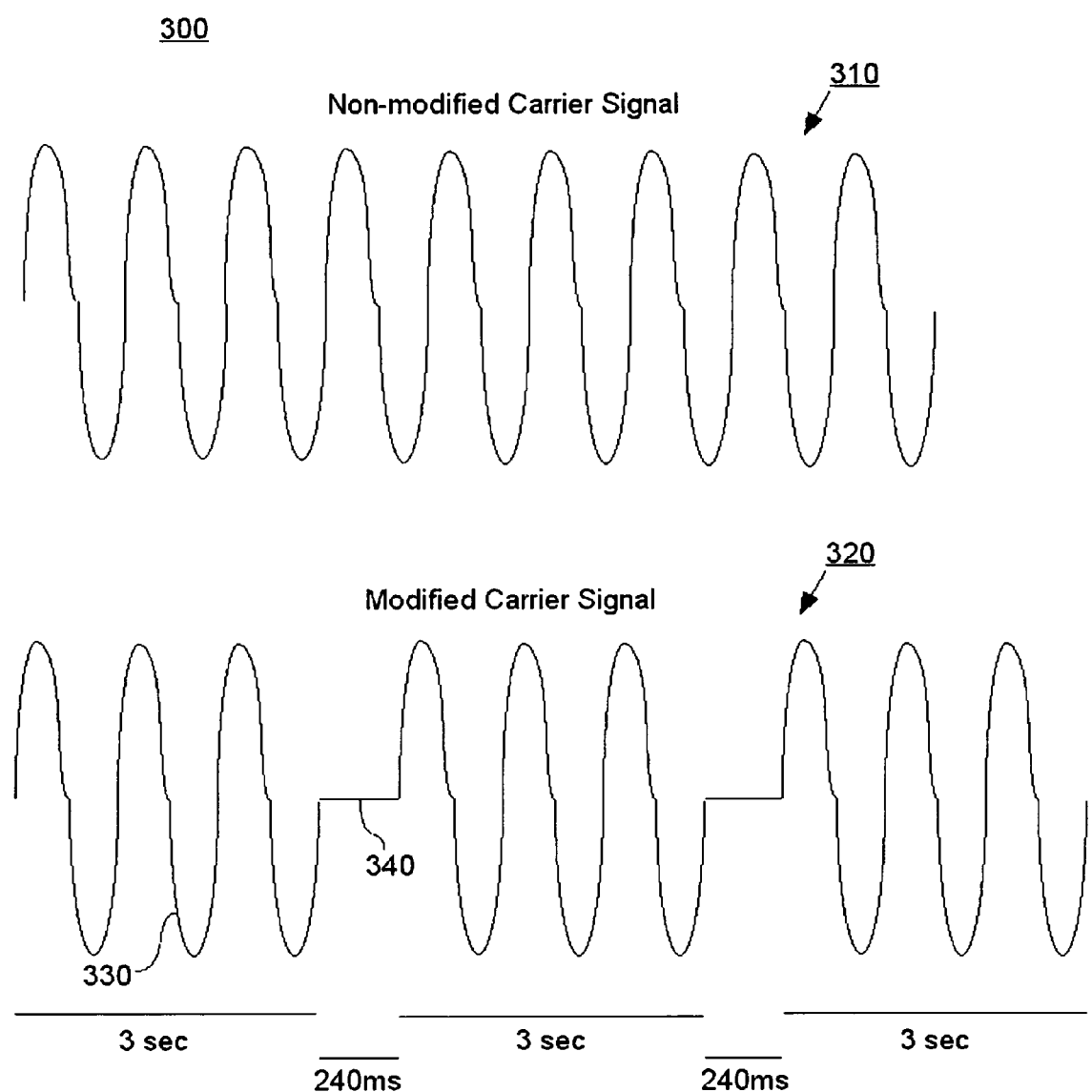

METHOD AND SYSTEM FOR ESTABLISHING A TELEPHONY DATA CONNECTION TO RECEIVER

FIELD OF THE INVENTION

This invention relates generally to telematics systems. In particular the invention relates to a method and system for establishing a telephony data connection to a receiver.

BACKGROUND OF THE INVENTION

One of the fastest growing areas of communications technology is related to automobile network solutions. The demand and potential for wireless vehicle communication, networking and diagnostic services have recently increased. Although many vehicles on the road today have limited wireless communication functions, such as unlocking a door and setting or disabling a car alarm, new vehicles offer additional wireless communication systems that help personalize comfort settings, run maintenance and diagnostic functions, place telephone calls, access call-center information, update controller systems, determine vehicle location, assist in tracking vehicle after a theft of the vehicle and provide other vehicle-related services. Drivers can call telematics call centers and receive navigational, concierge, emergency, and location services, as well as other specialized help such as locating the geographical position of a stolen vehicle and honking the horn of a vehicle when the owner cannot locate it in a large parking garage. Telematics service providers can offer enhanced telematics services by supplying a subscriber with a digital handset.

A carrier signal is used to establish a CDMA (Code Division Multiple Access) telephony data connection between a telematics call center or third party entity and a receiver, such as a telematics unit in a vehicle. Various aspects of the CDMA telephony network work to attenuate the carrier signal, rendering it ineffective. This results in the inability to establish a data connection between the call center and the telematics unit.

It is desirable therefore, to provide a method and system for establishing a telephony data connection to a receiver, that overcomes the challenges and obstacles described above.

SUMMARY OF THE INVENTION

The current invention provides a method for establishing a telephony data connection to a receiver. The telephony data connection is initiated at a source location. A carrier signal is generated for the connection and the carrier signal is modified. The modified carrier signal is sent to the receiver. Identification data is received from the receiver.

Another aspect of the current invention provides a computer usable medium including computer program for establishing a telephony data connection to a receiver. The computer usable medium comprises: computer program code for initiating the telephony data connection at a source location; computer program code for generating a carrier signal for the connection; computer program code for modifying the carrier signal; computer program code for sending the modified carrier signal to the receiver; and computer program code for receiving identification data from the receiver.

Another aspect of the current invention provides a system for enabling a device function of a vehicle. The system comprises: means for initiating the telephony data connection at a source location; means for generating a carrier signal for the connection; means for modifying the carrier signal; means for sending the modified carrier signal to the receiver; and means for receiving identification data from the receiver.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 2 is a flow diagram of method for establishing a telephony data connection to a receiver in accordance with one embodiment of the current invention; and FIG. 3 is a diagram detailing the step of modifying the carrier signal at block 230 of FIG. 2.

DETAILED DESCRIPTION OF THE PRESENTLY PREFERRED EMBODIMENTS

Figure 1:
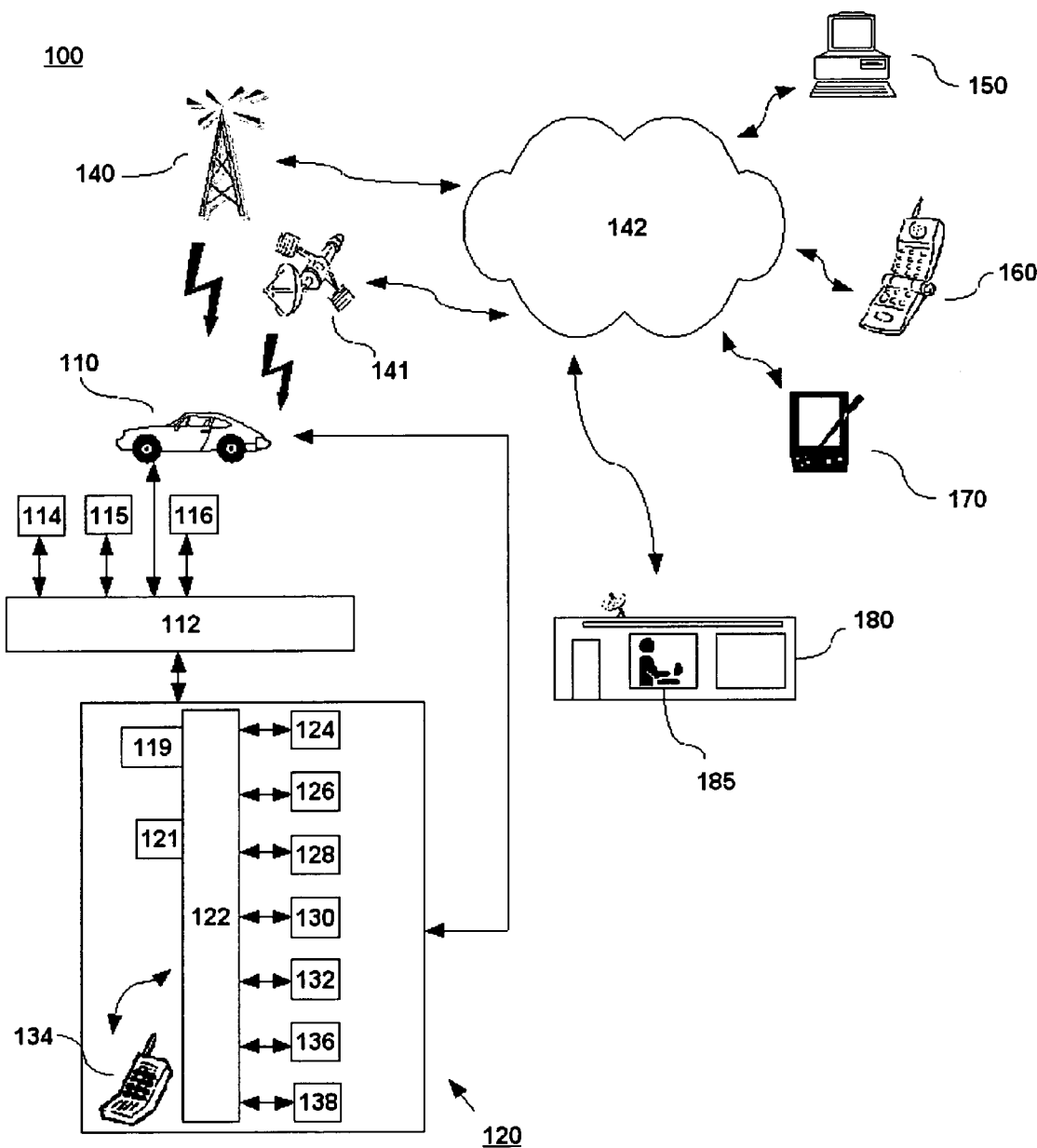
FIG. 1 is a schematic diagram of a system for establishing a telephony data connection to a receiver in accordance with one embodiment of the current invention.

FIG. 1 is a schematic diagram of a system for establishing a telephony data connection to a receiver in accordance with one embodiment of the current invention at 100. The system for establishing a telephony data connection to a receiver at 100 comprises: a mobile vehicle 110, a receiver, such as telematics unit 120, one or more wireless carrier systems 140, or one or more satellite carrier systems 141, one or more communication networks 142, and one or more call centers 180. Mobile vehicle 110 is a vehicle such as a car or truck equipped with suitable hardware and software for transmitting and receiving speech and data communications.

In one embodiment of the invention, telematics unit comprises: a digital signal processor (DSP) 122 connected to a wireless modem 124; a global positioning system (GPS) receiver or GPS unit 126; an in-vehicle memory 128; a microphone 130; one or more speakers 132; an embedded or in-vehicle phone 134 or an email access appliance 136; and a display 138. DSP 122 is also referred to as a microcontroller, controller, host processor, ASIC, or vehicle communications processor. GPS unit 126 provides longitude and latitude coordinates of the vehicle, as well as a time stamp and a date stamp. In-vehicle phone 134 is an analog, digital, dual-mode, dual-band, multi-mode or multi-band cellular phone.

Telematics unit 120 can store GPS location data and other data files in in-vehicle memory 128. Telematics unit 120 can set or reset calling-state indicators and can enable or disable various cellular-phone functions, telematics-unit functions and vehicle functions when directed by program code running on DSP 122. Telematics unit 120 can send and receive over-the-air messages using, for example, a pseudo-standard air-interface function or other proprietary and non-proprietary communication links.

DSP 122 executes various computer programs and computer program code, within telematics unit 120, which interact with electronic and mechanical systems. DSP 122 controls communications between telematics unit 120, wireless carrier system 140 or satellite carrier system 141 communications network 142 and call center 180. A speech-recognition engine 119, which can translate human speech input through microphone 130 to digital signals used to control functions of telematics unit, is installed in telematics unit 120. The interface to telematics unit 120 includes one or more buttons (not shown) on telematics unit 120, or on an associated keyboard or keypad that are also used to control functions of telematics unit 120. A text to speech synthesizer 121 can convert text strings to audible messages that are played through speaker 132 of telematics unit 120.

Speech recognition engine 119 and buttons are used to activate and control various functions of telematics unit 120, such as placing personal calls, contacting a communication services advisor 185, or requesting emergency services. In another embodiment, the interface to telematics unit 120 includes other forms of preference and data entry including touch-screens, wired or wireless keypad remotes, or other wirelessly connected devices such as Bluetooth-enabled devices or 802.11-enabled devices.

DSP 122 controls, generates and accepts digital signals transmitted between telematics unit 120 and a vehicle communication bus 112 that is connected to various vehicle components 114, vehicle devices 115, and various sensors 116 in mobile vehicle 110. DSP 122 can activate various programming and operation modes, as well as provide for data transfers. In facilitating interactions among the various communication and electronic modules, vehicle communication bus 112 utilizes bus interfaces such as controller-area network (CAN), J1850, International Organization for Standardization (ISO) Standard 9141, ISO Standard 11898 for high-speed applications, and ISO Standard 11519 for lower speed applications.

Mobile vehicle 110 via telematics unit 120 sends and receives radio transmissions from wireless carrier system 140, or satellite carrier system 141. Wireless carrier system 140, or satellite carrier system 141 is any suitable system for transmitting a signal from mobile vehicle 110 to communication network 142.

Communication network 142 includes services from mobile telephone switching offices, wireless networks, public-switched telephone networks (PSTN), and Internet protocol (IP) networks. Communication network 142 comprises a wired network, an optical network, a fiber network, another wireless network, or any combination thereof. Communication network 142 connects to mobile vehicle 110 via wireless carrier system 140, or satellite carrier system 141.

Communication network 142 can send and receive short messages according to established protocols such as dedicated short range communication standard (DSRC), IS-637 standards for short message service (SMS), IS-136 air-interface standards for SMS, and GSM 03.40 and 09.02 standards. In one embodiment of the invention, similar to paging, an SMS communication is posted along with an intended recipient, such as a communication device in mobile vehicle 110.

Call center 180 is a location where many calls are received and serviced at the same time, or where many calls are sent at the same time. In one embodiment of the invention, the call center is a telematics call center, facilitating communications to and from telematics unit 120 in mobile vehicle 110. In another embodiment, the call center 180 is a voice call center, providing verbal communications between a communication service advisor 185, in call center 180 and a subscriber. In another embodiment, call center 180 contains each of these functions.

Communication services advisor 185 is a real advisor or a virtual advisor. A real advisor is a human being in verbal communication with a user or subscriber. A virtual advisor is a synthesized speech interface responding to requests from user or subscriber. In one embodiment, the virtual advisor includes one or more recorded messages. In another embodiment, the virtual advisor generates speech messages using a call center based text to speech synthesizer (TTS). In another embodiment, the virtual advisor includes both recorded and TTS generated messages.

Call center 180 provides services to telematics unit 120. Call center 180 can initiate telephony data connections and generate, modify and transmit carrier signals to a receiver such as telematics unit 120 through wireless carrier system 140, satellite carrier systems 141, and communication network 142.

Call center 180 can receive data from telematics unit 120, through wireless carrier system 140, satellite carrier systems 141, and communication network 142. Call center 180 can determine mobile identification numbers (MINS) and telematics unit identifiers associated with a telematics unit access request, compare MINs and telematics unit identifiers with a database of identifier records, and send calling-state messages to the telematics unit 120 based on the request and identification numbers.

Communication network 142 connects wireless carrier system 140 or satellite carrier system 141 to a user computer 150, a wireless or wired phone 160, a handheld device 170, such as a personal digital assistant, and call center 180. User computer 150 or handheld device 170 has a wireless modem to send data through wireless carrier system 140, or satellite carrier system 141, which connects to communication network 142. In another embodiment, user computer 150 or handheld device 170 has a wired modem that connects to communications network 142. Data is received at call center 180. Call center 180 has any suitable hardware and software capable of providing web services to help transmit messages and data signals from user computer 150 or handheld device 170 to telematics unit 120 in mobile vehicle 110.

FIG. 2 is a flow diagram of method for establishing a CDMA telephony data connection to a receiver in accordance with one embodiment of the current invention. The method for establishing a CDMA telephony data connection to a receiver at 200 begins (block 205) by initiating a CDMA telephony data connection at a source location (block 210). A source location is a telematics call center or a third party entity with the proper hardware and software for establishing a telephony data connection to a receiver, such as a telematics unit. A carrier signal is generated for the connection (block 220). To successfully establish a CDMA telephony data connection, the receiver must be able to detect the carrier signal. The carrier signal typically has a frequency of 2225 Hz. Various components of CDMA telephony network deployments act to attenuate the carrier signal preventing its detection by the receiver. These network components include various noise cancellation algorithms, carrier switches and network routers.

The carrier signal is modified to enable it to pass through or bypass any network components that would attenuate the signal (block 230). The modified carrier signal is sent to the receiver (block 240). Upon detection of the carrier signal "tone," the receiver responds by sending a carrier signal to the source location. The carrier signal generated at the receiver is typically 1778 Hz for digital communication networks or 1270 Hz for analog communication networks. Once the initial "tone" validation is successfully completed, identification data is received from the receiver (block 250) allowing the source location to authenticate the receiver and begin voice or modulated data transmissions. The method ends (block 295).

FIG. 3 is a diagram detailing the step of modifying the carrier signal at block 230 of FIG. 2 at 300. The unmodified carrier signal 310 has a frequency of 2225 Hz. The modified carrier signal 320 has the same 2225 Hz frequency, which proceeds for 3 seconds 330. After the 3 seconds has elapsed a 240-millisecond period of quiescence 340 is enforced in the carrier signal. The carrier signal then continues at 2225 Hz for 3 seconds followed by another 240-millisecond period of quiescence. This process repeats for the duration of the telephony data connection allowing detection of the carrier signal at the receiver.

The preferred values of 3 seconds and 240 milliseconds described above are nominal values. These values will vary depending on the nature and character of the noise suppression algorithms, the carrier switches, and other components of the carrier networks.

While embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for establishing a telephony data connection to a receiver, the method comprising:
    initiating the telephony data connection across a wireless carrier system having at least one network component that prevents an uninterrupted carrier signal from being detected by the receiver;
    generating the uninterrupted carrier signal;
    modifying the carrier signal by intermittently adding a period of quiescence; and
    sending the modified carrier signal to the receiver via the network component.

2. The method of claim 1 wherein the network component includes a noise cancellation algorithm that is applied to signals sent across the wireless carrier system, and wherein the initiating and sending steps further comprise applying the noise cancellation algorithm to the carrier signal.

3. The method of claim 1 wherein the carrier signal has a frequency of 2225 Hz.

4. The method of claim 1 wherein the receiver is a telematics unit.

5. The method of claim 1 wherein the period of quiescence has a duration of substantially 240 milliseconds.

6. The method of claim 1 wherein the period of quiescence is added every approximately every 3 seconds.

7. A method of using a carrier signal tone to establish a telephony connection for voice or data communication over a wireless carrier system, comprising the steps of:
    initiating the telephony connection using a wireless carrier system having at least one network component that attenuates the carrier signal tone when it is sent through the network component as a continuous signal;
    generating a carrier signal comprising interrupted segments of the carrier signal tone; and
    sending the carrier signal over the telephony connection to a receiver, wherein said sending step further comprises passing the carrier signal through the network component such that the carrier signal is detectable at the receiver.

8. The method set forth in claim 7, wherein said network component applies a noise suppression algorithm to signals sent across the telephony connection, wherein said noise suppression algorithm attenuates the continuous signal such that it is not detectable by the receiver.

9. The method set forth in claim 7, wherein the sending step further comprises sending the carrier signal from a source location, and wherein the method further comprises the steps of receiving the carrier signal at a receiver and returning a responsive tone to the source location.

10. The method set forth in claim 7, wherein the carrier signal includes periods of quiescence alternating with periods of the carrier signal tone.

11. The method set forth in claim 10, wherein the carrier signal tone has a frequency of 2225 Hz.

12. The method set forth in claim 10, wherein the periods of quiescence have a duration of substantially 240 milliseconds.

13. The method set forth in claim 10, wherein the periods of the carrier signal tone have a duration of substantially 3 seconds.

* * * * *